Sept. 20, 1966  HIROSHI FUJITA  3,273,669

CENTRALIZED LUBRICATING SYSTEM

Filed April 10, 1964

3,273,669
CENTRALIZED LUBRICATING SYSTEM
Hiroshi Fujita, Shiga-ken, Japan, assignor to Daikin Kogyo Co., Ltd., Osaka, Japan, a corporation of Japan
Filed Apr. 10, 1964, Ser. No. 358,699
Claims priority, application Japan, Apr. 12, 1963, 38/19,210
1 Claim. (Cl. 184—7)

This invention relates to centralized lubricating systems including a number of distributing valve assemblies.

Centralized lubricating systems generally utilize a single lubricant circulating pressure pump and a plurality of distributing valves which are connected with the pressure pump by appropriate conduit means to receive lubricant therefrom and distribute it in appropriate quantities to respective areas to be lubricated. Various forms of such centralized lubricating system have previously been proposed but none of them have proven fully satisfactory.

The present invention is particularly concerned with the construction of distributing valve assemblies as a critical part of the centralized lubricating system and with the circuit arrangement of such lubricating system, and has for its object to provide a highly efficient centralized lubricating system incorporating a plurality of improved distributing valve assemblies and a novel extremely simplified circuit arrangement.

According to the present invention, there is provided a centralized lubricating system which includes a plurality of distributing valve assemblies arranged in series with each other in a loop of conduit line, each of said distributing valve assemblies comprising a casing having an axial cavity formed therein and openings formed in the opposite end walls of said casing to communicate with the adjacent ends of said cavity, a pilot plunger fitted in said cavity for free reciprocatory sliding movement therein over a definite length of stroke with a number of spaced bores formed through said pilot plunger transversely thereof and in alignment with each other, a corresponding number of metering plungers fitted in said respective transverse bores for free reciprocatory sliding movement therein, and a pair of check valves arranged in said pilot plunger at the opposite ends thereof and each in communication with the adjacent one of said transverse bores and also with the adjacent one of said end openings in said casing in a manner so as to allow fluid flow through said check valve only in an outward direction, and fluid passage means including two sets of aligned outlet ports communicating with said respective transverse bores, the arrangement being such that the fluid directed under pressure into said transverse bores alternately through said end openings in said casing is discharged from the valve assembly through either set of said outlet ports by means of said metering plungers.

The present invention will now be described in further detail with reference to the accompanying drawing, which illustrates diagrammatically one preferred form of distributing valve assembly embodying the present invention.

Figure 1:
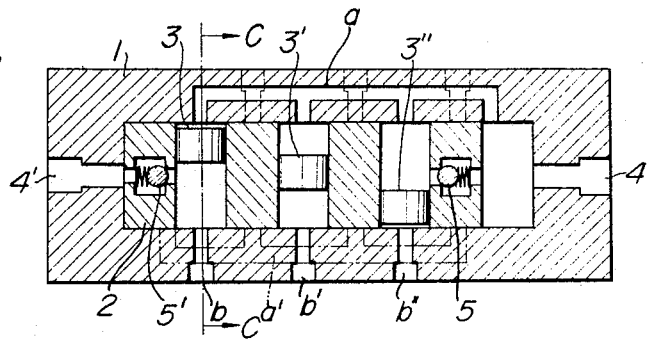
FIG. 1 is a diagrammatic longitudinal cross-sectional view of the distributing valve assembly, taken along the lines A—A in FIG. 3.

In the drawing, there is illustrated a distributing valve assembly which includes a valve casing 1 which has formed therein an axial pilot-plunger accommodating cavity and openings 4 and 4' formed in the opposite end walls of said casing 1 to communicate with the respective ends of said cavity. A pilot plunger 2 is fitted in said cavity for free reciprocatory sliding movement therein over a definite length of stroke with a number spaced bores formed through the pilot plunger 2 transversely thereof and in alignment with each other. A corresponding number of metering plungers 3, 3' and 3" are fitted in said respective transverse bores for free reciprocatory sliding movement therein. A pair of check valves 5 and 5' are arranged in the pilot plunger 2 at the opposite ends thereof and are each in communication with the adjacent one of said transverse bores and also with the adjacent one of end openings 4 or 4' formed in the valve casing 1. It will be observed that each of these check valves allows fluid flow therethrough only in an outward direction from the adjacent transverse bore into the adjacent end opening.

Figure 3:
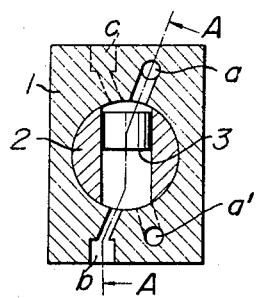
FIG. 3 is a diagrammatic transverse cross-sectional view of the valve assembly taken along the line C—C in FIG. 1.

A fluid passageway $a$ is formed in the top wall of the valve casing 1 and opens to the pilot-plunger accommodating cavity at points opposite to the respective transverse bores in the pilot plunger 2 as fitted in the cavity and also at a point adjacent to one end of the pilot-plunger accommodating cavity as shown in FIG. 1 has openings to said pilot-plunger accommodating cavity at axially aligned points which are opposite to the respective transverse bores in the pilot-plunger when it is at one end of its stroke and to one end portion of the pilot-plunger accommodating cavity which is then free of the pilot plunger. A set of outlet ports $b$, $b'$ and $b''$ are formed in the bottom casing wall in axial alignment with each other and in communication with the respective transverse bores in the pilot plunger. The passageway $a$ and outlet ports $b$, $b'$ and $b''$ lie substantially in a common diametral plane with respect to the axis of the pilot plunger 2, as shown in FIGS. 1 and 3.

Figure 2:
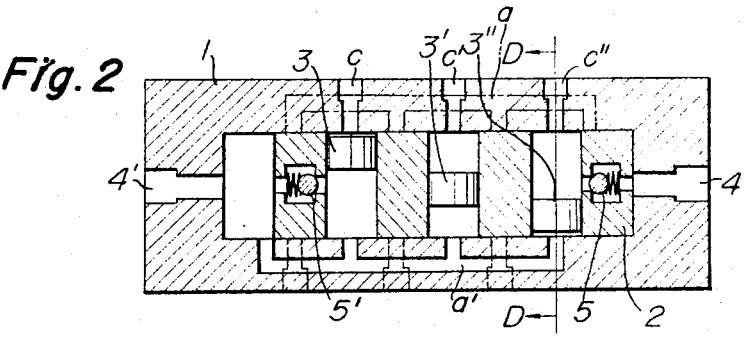
FIG. 2 is a view similar to FIG. 1, taken along the lines B—B in FIG. 4.
Figure 4:
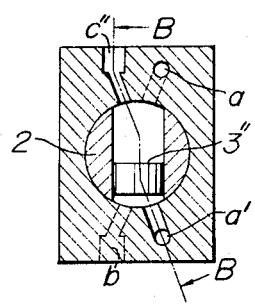
FIG. 4 is a view similar to FIG. 3, taken along the line D—D in FIG. 2.

Another passageway $a'$ and another set of outlet ports $c$, $c'$ and $c''$ are formed also in the casing wall, which are similar to the passageway $a$ and outlet ports $b$, $b'$ and $b''$, respectively, but lie in a common diametral plane angularly spaced from that including the passageway $a$ and outlet ports $b$, $b'$ and $b''$, as shown clearly in FIGS. 2 and 4.

It is to be understood that in normal use a desired number of such distributing valve assemblies are arranged in series with each other in a loop of conduit line, not shown.

The operation of the distributing valve assembly described above is as follows.

Referring first to FIG. 2, in which the pilot plunger 2 is at the right-hand end of its stroke, it is assumed that lubricant fluid is fed by an oil pressure pump, not shown, to the end opening 4 at the right-hand end of the valve casing 1. On this occasion, the check valve 5 adjacent to the opening 4 is closed so that the pilot plunger 2 is pushed to the left to assume a position shown in FIG. 1, where the fluid pressure is allowed to enter the passageway $a$ and act upon the metering plungers 3, 3' and 3" at their top ends thereby to force them downward so that the metered quantities of lubricant which have been filled in the bore spaces under the respective metering plungers 3, 3' and 3" during the previous stroke of the pilot plunger 2 are discharged through the respective outlet ports $b$, $b'$ and $b''$.

In the above process, it will be understood that the metering plungers are acted upon successively in the order from right to left as viewed in FIGS. 1 and 2. When the metering plunger 3 at the left-hand end has completed its down stroke, the fluid pressure contained in the associated transverse bore acts to open the adjacent check valve 5' and flows out of the valve assembly through the adjacent end opening 4' to be directed to the next distributing valve assembly (not shown) connected in series with the one shown and described above.

The above operation is then repeated progressively in the following valve assemblies, all of which are arranged in series with each other in the loop of conduit, and when the final valve assembly has completed its operation a reversing valve not shown is operated manually or under automatic control so that fluid under pressure is again circulated through the loop of conduit this time in the opposite direction.

In this second half cycle of operation, the fluid under pressure is directed into the distributing valve assembly through the opposite end opening 4', which served as an outlet in the preceding half cycle of operation, and, closing the check valve 5' arranged in the adjacent end of the pilot plunger 2, drives the latter to the right. As the pilot plunger completes its stroke to the right to assume a position shown in FIG. 2, the fluid starts to enter the passageway $a'$ so that the metering plungers 3, 3' and 3'' are forced upward to discharge the metered quantities of lubricant, which were filled in the bore spaces above the respective metering plungers during the preceding half cycle of operation, through the respective outlet parts $c$, $c'$ and $c''$.

Upon completion of the up stroke of the rightmost metering plunger 3'', the adjacent check valve 5 is opened to allow lubricant to proceed through the adjacent end opening 4 to the next series-connected distributing valve, not shown.

The above operation of the distributor valve assembly is repeated under manual or automatic control of a reversing valve, not shown, to supply lubricant to areas to be lubricated, as was readily understood.

According to the present invention, the distributing valve assembly can be made extraordinarily compact in size since it is constructed with a desired number of metering plungers accommodated in a single axially movable pilot plunger. In normal use, where a plurality of such distributing valve assemblies are arranged in series with each other in a single conduit line, the operation of all the valve assemblies can be ensured as long as the final valve assembly in the series connection is properly operated. Accordingly, in cases where the valve assemblies are arranged in a loop of conduit line including a reversing valve so that lubricant may flow therefrom through the successive series-connected distributor valves back to the reversing valve, the completion of the lubricating operation of all the distributor valves can be readily confirmed at the location of the reversing valve. In addition to these advantages, the lubricating system according to the present invention is also advantageous in that it requires only a single line of fluid conduit, substantially simplifying the labor and material required for piping arrangement.

What is claimed is:

A centralized lubricating system including a plurality of distributing valve assemblies arranged in series with each other in a loop of conduit line, each of said distributing valve assemblies comprising a casing having an axial cavity formed therein and openings formed in the opposite end walls of said casing to communicate with the adjacent ends of said cavity, a pilot plunger fitted in said cavity for free reciprocatory sliding movement therein over a definite length of stroke with a number of spaced bores formed through said pilot plunger transversely thereof and in alignment with each other, a corresponding number of metering plungers fitted in said respective transverse bores for free reciprocatory sliding movement therein, and a pair of check valves arranged in said pilot plunger at the opposite ends thereof and each in communication with the adjacent one of said transverse bores and also with the adjacent one of said end openings in a manner so as to allow fluid flow through said check valve in an outward direction, and fluid passage means including two sets of aligned outlet ports communicating with said respective transverse bores, the arrangement being such that the fluid directed under pressure into said transverse bores alternately through said end openings in said casing is discharged from the valve assembly through a set of said outlet ports by means of said metering plungers.

References Cited by the Examiner

UNITED STATES PATENTS 2,856,023  10/1958  Graves _____ 184—7

FOREIGN PATENTS 98,555  7/1961  Netherlands.

LAVERNE D. GEIGER, *Primary Examiner.*

H. BELL, *Examiner.*